(12) United States Patent
Schmitz et al.

(10) Patent No.: US 8,050,570 B2
(45) Date of Patent: Nov. 1, 2011

(54) OPTOELECTRONIC SENSOR

(75) Inventors: Stephan Schmitz, Freiburg (DE); Boris Szerbakowski, Waldkirch (DE); Martin Geiler, Gutach (DE); Markus Kohler, Emmendingen (DE); Markus Hammes, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 698 days.

(21) Appl. No.: 12/216,626

(22) Filed: Jul. 8, 2008

(65) Prior Publication Data
US 2009/0016735 A1 Jan. 15, 2009

(30) Foreign Application Priority Data

Jul. 10, 2007 (DE) .................. 10 2007 032 173
Feb. 15, 2008 (DE) .................. 10 2008 009 180

(51) Int. Cl.
H04B 10/00 (2006.01)
(52) U.S. Cl. .................. 398/130; 398/128; 398/119
(58) Field of Classification Search .......... 398/118–131
See application file for complete search history.

(56) References Cited

U.S. PATENT DOCUMENTS

| 3,746,863 | A | * | 7/1973 | Pronovost | 250/222.1 |
| 4,266,124 | A | * | 5/1981 | Weber et al. | 250/221 |
| 5,008,898 | A | * | 4/1991 | Hamatsu et al. | 375/151 |
| 5,130,532 | A | * | 7/1992 | Clemens | 250/221 |
| 5,180,910 | A | * | 1/1993 | Spratte et al. | 250/221 |
| 5,266,810 | A | * | 11/1993 | Murphy | 250/559.24 |
| 5,341,029 | A | * | 8/1994 | Johnson | 307/112 |
| 5,424,532 | A | * | 6/1995 | Occheto et al. | 250/221 |
| 5,532,472 | A | * | 7/1996 | Furuta | 250/214 B |
| 5,760,941 | A | * | 6/1998 | Young et al. | 398/183 |
| 5,789,740 | A | * | 8/1998 | Ollhaeuser | 250/221 |
| 5,801,376 | A | * | 9/1998 | Haberl et al. | 250/221 |
| 5,818,617 | A | * | 10/1998 | Shipley | 398/54 |
| 6,211,807 | B1 | * | 4/2001 | Wilkison | 342/22 |
| 6,236,036 | B1 | * | 5/2001 | Kudo et al. | 250/221 |
| 6,414,603 | B1 | * | 7/2002 | Yamaguchi et al. | 340/815.4 |
| 6,547,042 | B1 | * | 4/2003 | Collins | 187/317 |

(Continued)

FOREIGN PATENT DOCUMENTS
DE 31 19 876 A1 12/1982
(Continued)

OTHER PUBLICATIONS

Kavehrad, M. et al., "Optical Code-Division-Multiplexed Systems Based on Spectral Encoding of Noncoherent Sources", Journal of Lightwave Technology, 1995, pp. 534-545, vol. 13, No. 3, IEEE.

(Continued)

Primary Examiner — Agustin Bello
(74) Attorney, Agent, or Firm — The Nath Law Group; Jerald L. Meyer; Stanley N. Protigal

(57) ABSTRACT

An optoelectronic sensor includes at least one light transmitter for the transmission of light signals into a monitored zone, at least one light receiver for the reception of light signals transmitted from the light transmitter and a control device for the generation and/or influencing of the light signals and for the generation of an object detection signal in the case of the presence of an object in the monitored region in dependence on the output signals of the light receiver. In this connection, the light signals transmitted into the monitored zone by the light transmitter are each generated by an output signal modulated in accordance with the spread spectrum method using a random pseudo-noise code.

29 Claims, 9 Drawing Sheets

U.S. PATENT DOCUMENTS

| | | | |
|---|---|---|---|
| 6,838,655 B2* | 1/2005 | Heimlicher | 250/221 |
| 6,872,932 B2* | 3/2005 | Emmanuel | 250/221 |
| 6,876,457 B2* | 4/2005 | Parstorfer et al. | 356/601 |
| 6,894,623 B2* | 5/2005 | Hama et al. | 340/815.54 |
| 6,914,401 B2* | 7/2005 | Semelka | 318/480 |
| 6,927,385 B2* | 8/2005 | Adamietz et al. | 250/221 |
| 6,982,945 B1* | 1/2006 | Gossett | 370/208 |
| 6,990,138 B2* | 1/2006 | Bejjani et al. | 375/146 |
| 7,003,021 B2* | 2/2006 | Gilhousen et al. | 375/150 |
| 7,012,738 B1* | 3/2006 | Schwarte | 359/325 |
| 7,081,713 B2* | 7/2006 | Jurs et al. | 315/134 |
| 7,122,782 B2* | 10/2006 | Sakaguchi | 250/222.1 |
| 7,271,722 B2* | 9/2007 | Iwasawa | 340/545.5 |
| 7,326,910 B2* | 2/2008 | Osako et al. | 250/221 |
| 7,326,914 B2* | 2/2008 | Pirkl | 250/221 |
| 7,343,062 B1* | 3/2008 | Dogul et al. | 385/15 |
| 7,405,812 B1* | 7/2008 | Bamji | 356/5.1 |
| 7,420,949 B2* | 9/2008 | Helmke | 370/337 |
| 7,569,843 B2* | 8/2009 | Lohmann | 250/559.4 |
| 7,633,398 B2* | 12/2009 | DuFaux et al. | 340/602 |
| 7,741,595 B2* | 6/2010 | Lohmann et al. | 250/221 |
| 7,755,024 B2* | 7/2010 | Platt et al. | 250/221 |
| 7,759,626 B2* | 7/2010 | Kikuchi et al. | 250/214 AL |
| 2003/0053519 A1* | 3/2003 | Gilhousen et al. | 375/141 |
| 2005/0211883 A1* | 9/2005 | Lohmann | 250/221 |
| 2006/0017545 A1* | 1/2006 | Volpi et al. | 340/10.4 |
| 2006/0140251 A1* | 6/2006 | Brown et al. | 375/135 |
| 2007/0200699 A1* | 8/2007 | Rohbeck | 340/555 |
| 2008/0143528 A1* | 6/2008 | Haberl et al. | 340/556 |
| 2009/0016735 A1* | 1/2009 | Schmitz et al. | 398/140 |

FOREIGN PATENT DOCUMENTS

| | | |
|---|---|---|
| DE | 40 10 274 A1 | 10/1990 |
| DE | 40 35 710 A1 | 5/1992 |
| DE | 195 10 304 C1 | 2/1996 |
| DE | 199 26 214 A1 | 1/2001 |
| DE | 100 46 136 A1 | 4/2002 |
| DE | 10 2004 003 814 A1 | 8/2005 |
| DE | 10 2008 009 180 A1 | 1/2009 |
| DE | 10 2008 015 286 A1 | 10/2009 |
| EP | 1 202 483 A1 | 5/2002 |
| EP | 1 318 606 A1 | 6/2003 |
| EP | 1 044 526 B1 | 2/2006 |
| EP | 2 015 110 A1 | 1/2009 |
| EP | 2 103 962 A1 | 9/2009 |
| WO | 99/41871 A1 | 8/1999 |
| WO | WO 02/060081 A2 | 8/2002 |
| WO | WO 02/093950 A2 | 11/2002 |

OTHER PUBLICATIONS

O'Farrell, Timothy et al., "Performance of a Spread Spectrum Infrared Transmission System Under Ambient Light Interference", 1998, pp. 703-707, IEEE.

Sarwate, Dilip V. et al., "Crosscorrelation Properties of Pseudorandom and Related Sequences", Proceedings of the IEEE, 1980, pp. 593-619, vol. 68, No. 5, IEEE.

Haykin, Simon, "Cognitive Radar: A way of the future", IEEE Signal Processing Magazine, 2006, pp. 30-40, IEEE.

Proakis, John G., "Interference Suppression in Spread Spectrum Systems", IEEE 4th International Symposium on Spread Spectrum Techniques and Applications, 1996, pp. 259-266, IEEE.

Chuandan, Wang et al., "Interference Avoidance Using Fractional Fourier Transform in Transform Domain Communication System", The 9th International Conference on Advanced Communication Technology, 2007, pp. 1756-1760.

Chen, Xiaowen et al., "Frequency Domain Interference Suppression in a DSSS System", IEEE International Conference on Communications, Circuits and Systems and West Sino Expositions Proceedings, 2002, pp. 247-251, IEEE.

Meel, J., "Spread spectrum (SS)", De Nayer Instituut, Hogeschool voor Wetenschap & Kunst, 1999, pp. 1-33.

Ipatov, Valery P., "Spread Spectrum and CDMA: Principles and Applications," (2005), Chapter 3, Merits of Spread Spectrum, pp. 77-82, John Wiley and Sons Ltd.

Simon, Marvin K., et al., "Spread Spectrum Communications Handbook," (1994), Chapter 1, Coherent Direct-Sequence Systems, pp. 403-406, McGraw-Hill.

* cited by examiner

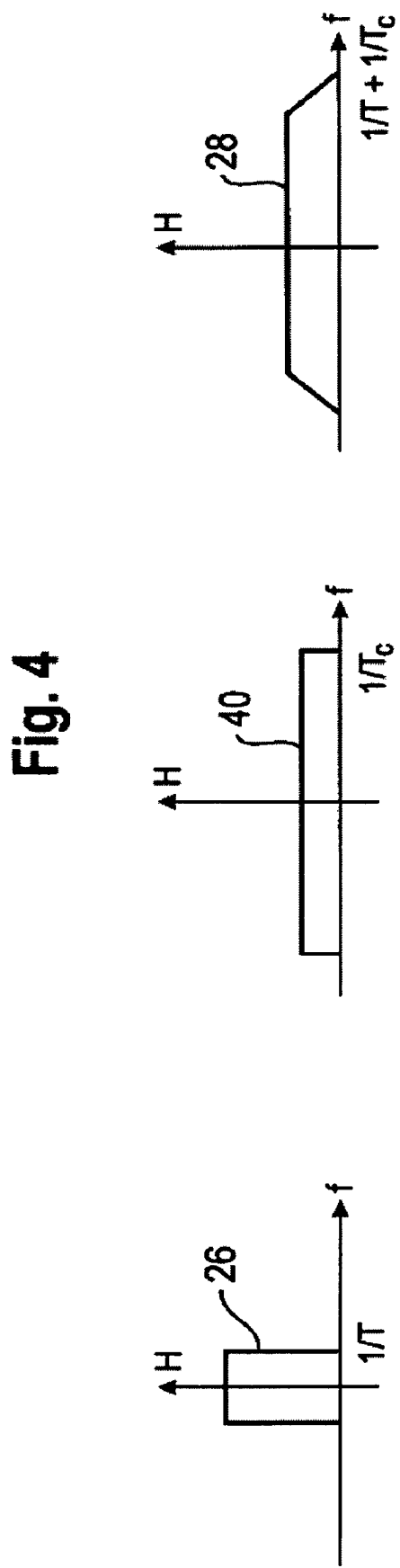

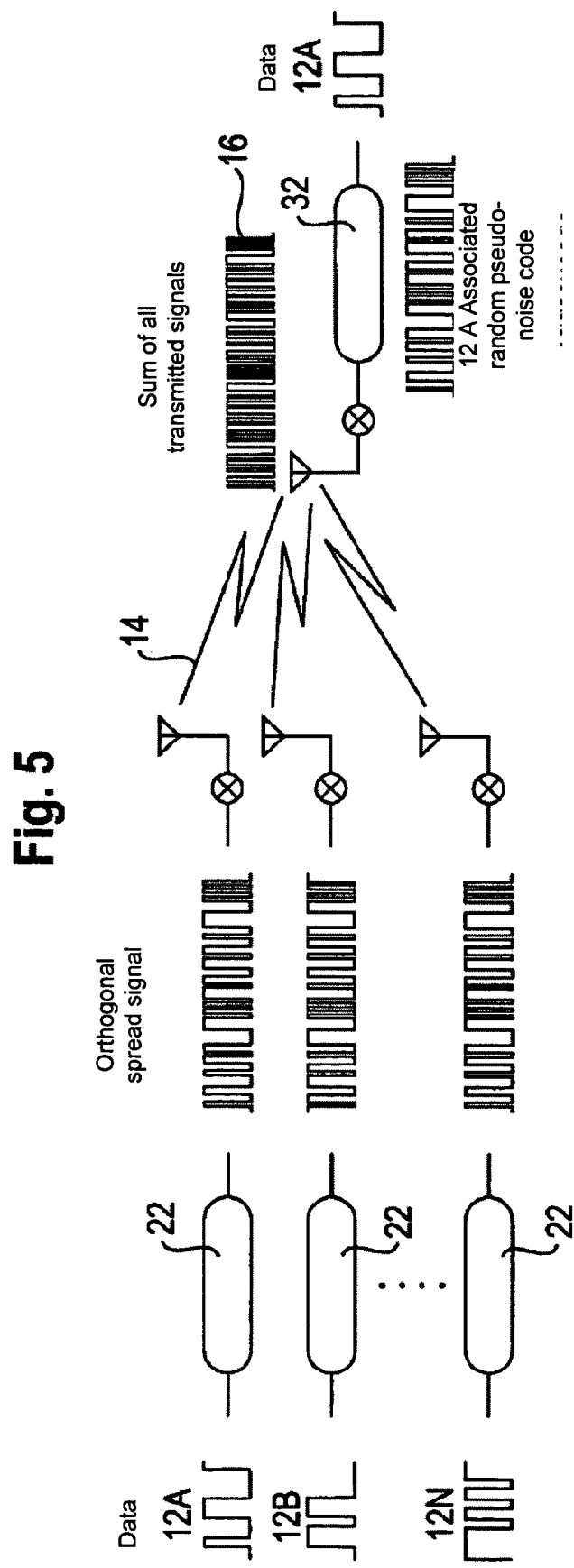

Fig. 6 a) LIGHT TRANSMITTER CODES

| 12A | 1 | -1 | -1 | 1 | 1 | 1 |
|-----|---|----|----|----|----|----|
| 12B | 1 | 1  | 1  | -1 | 1 | 1 |
| 12C | 1 | 1  | -1 | -1 | 1 | 1 | b) RADIATION OF 12A

| TRANSMISSION (DATA BIT=1) | 1 | -1 | -1 | 1 | 1 | 1 | |
|---|---|---|---|---|---|---|---|
| RECEIVER CODE WORD | 1 | -1 | -1 | 1 | 1 | 1 | |
| MULTIPLICATION | 1 | 1 | 1 | 1 | 1 | 1 | 6 |

| TRANSMISSION (DATA BIT=1) | -1 | 1 | 1 | -1 | -1 | -1 | |
|---|---|---|---|---|---|---|---|
| RECEIVER CODE WORD | 1 | -1 | -1 | 1 | 1 | 1 | |
| MULTIPLICATION | -1 | -1 | -1 | -1 | -1 | -1 | -6 | c) TRANSMISSION OF 12B, RECEIVER ATTEMPTS TO RECOVER THE TRANSMISSION OF 12A

| TRANSMISSION (DATA BIT=1) | 1 | 1 | 1 | -1 | 1 | 1 | |
|---|---|---|---|---|---|---|---|
| RECEIVER CODE WORD | 1 | -1 | -1 | 1 | 1 | 1 | |
| MULTIPLICATION | 1 | -1 | -1 | -1 | 1 | 1 | 0 | d) TRANSMISSION OF 12C, RECEIVER ATTEMPTS TO RECOVER THE TRANSMISSION OF 12A

| TRANSMISSION (DATA BIT=1) | 1 | 1 | -1 | -1 | 1 | 1 | |
|---|---|---|---|---|---|---|---|
| RECEIVER CODE WORD | 1 | -1 | -1 | 1 | 1 | 1 | |
| MULTIPLICATION | 1 | -1 | 1 | -1 | 1 | 1 | 0 | e) TRANSMISSION OF 12C, RECEIVER ATTEMPTS TO RECOVER THE TRANSMISSION OF 12B

| 12B (DATA BIT=1) | 1 | 1 | 1 | -1 | 1 | 1 | |
|---|---|---|---|---|---|---|---|
| 12C (DATA BIT=1) | 1 | 1 | -1 | -1 | 1 | 1 | |
| COMBINED SIGNAL | 2 | 2 | -2 | 0 | 2 | 2 | |
| RECEIVER CODE WORD | 1 | -1 | 1 | -1 | 1 | 1 | |
| | 2 | 2 | 0 | 2 | 2 | 2 | 8 |

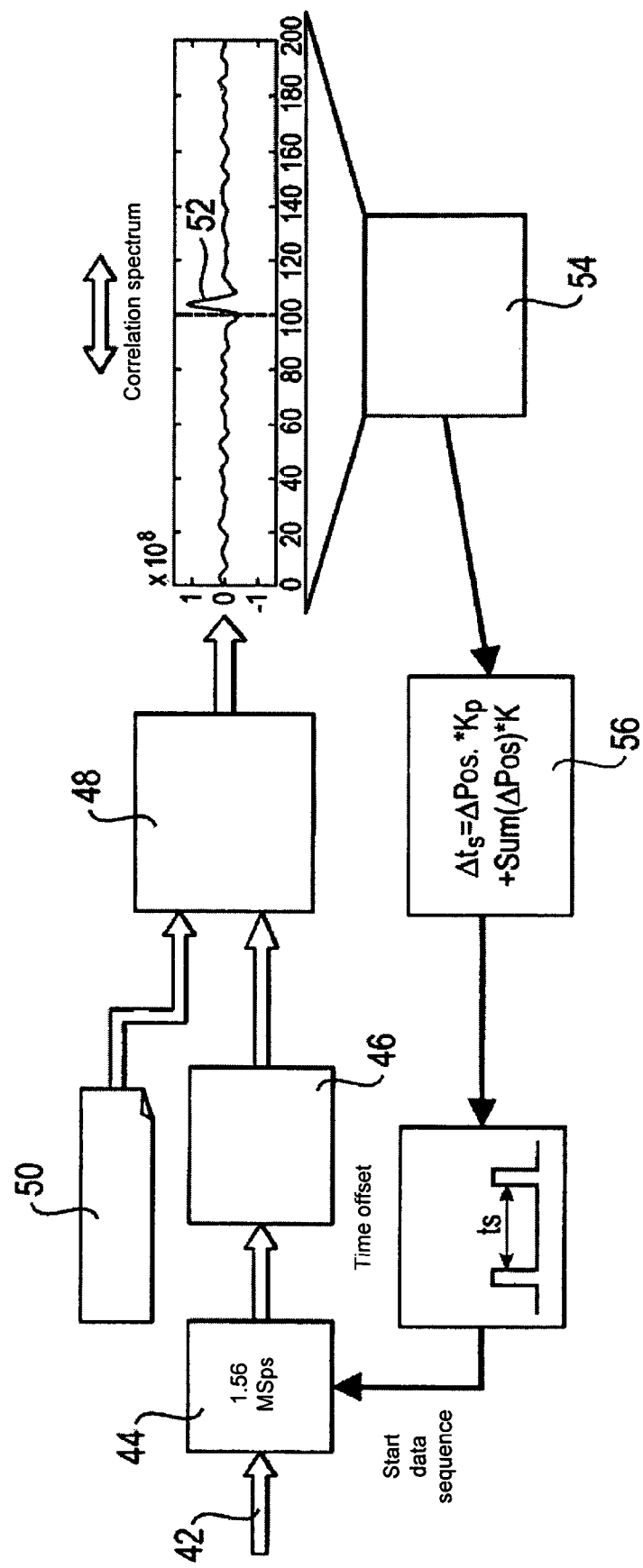

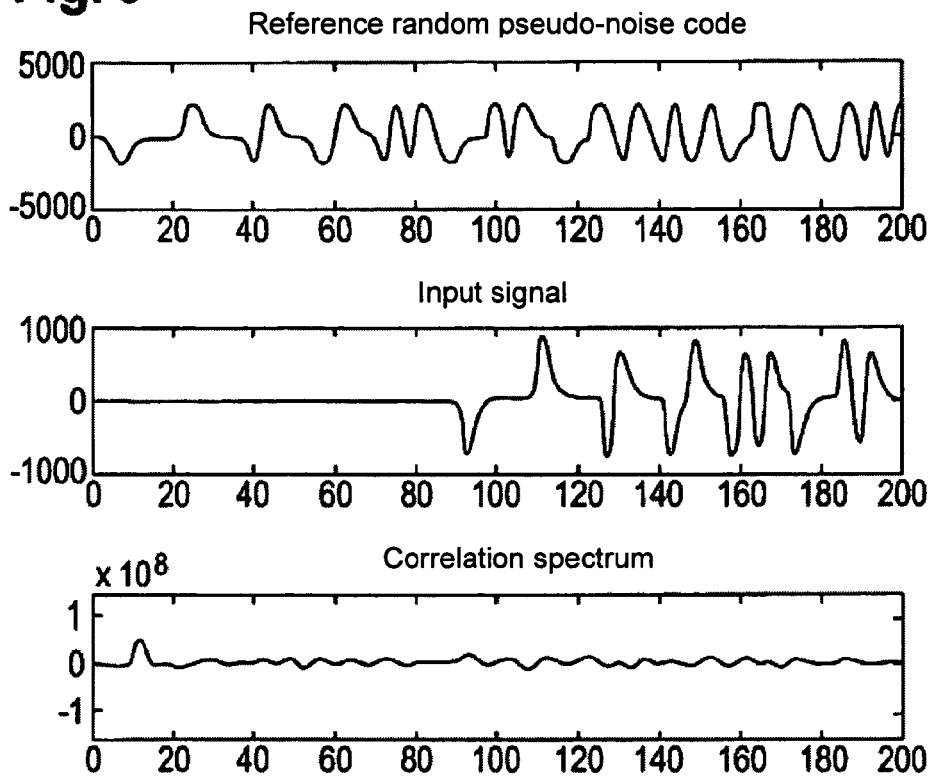
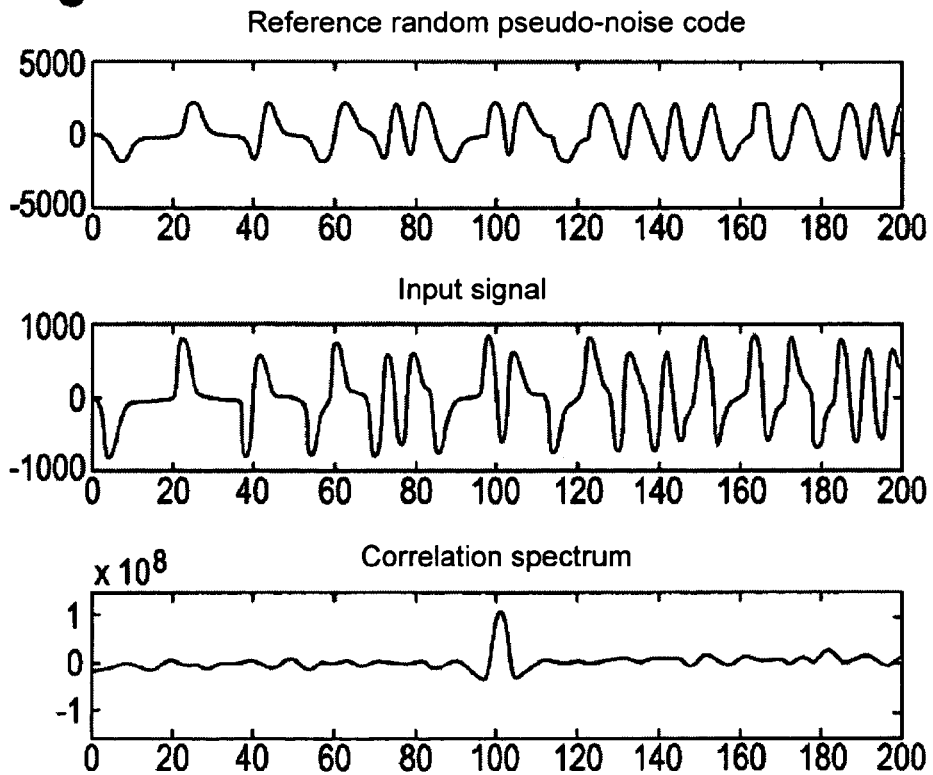

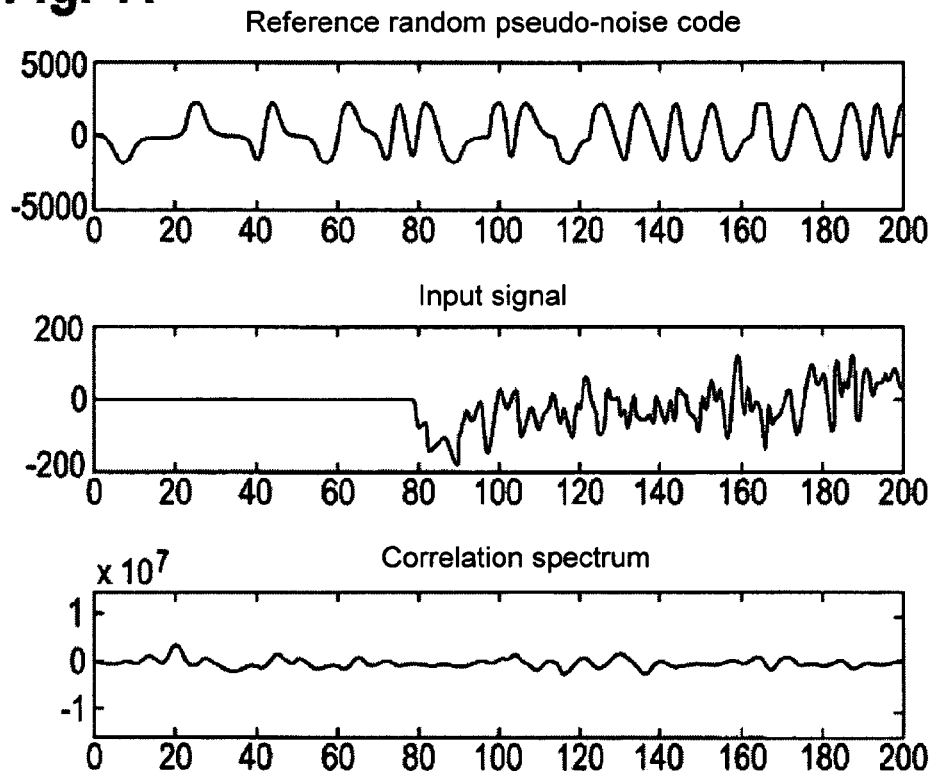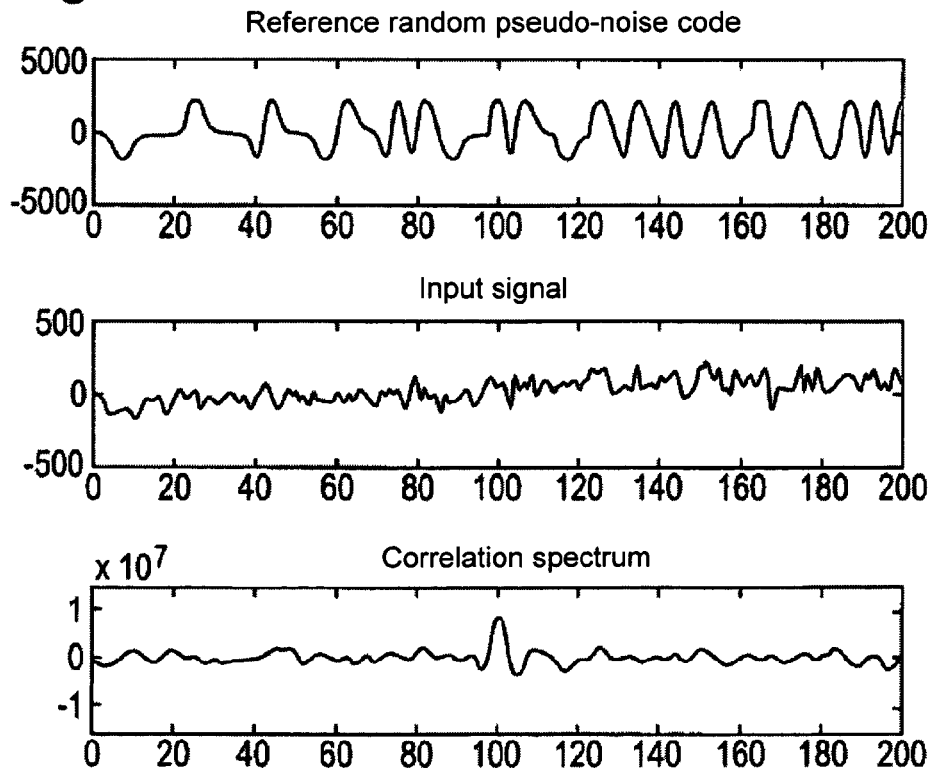

OPTOELECTRONIC SENSOR

The invention relates to an optoelectronic sensor having at least one light transmitter for the transmission of light signals into a monitored zone, at least one light receiver for the reception of light signals transmitted by the light transmitter and a control device for the generation and/or influencing of the light signals and for the generation of an object detection signal in the case of the presence of an object in the monitored zone in dependence on the output signals of the light receiver.

Such sensors are used, for example, as simple light barriers or as multi-ray light grid systems for access monitoring, where in particular dangerous machine working zones or specific spaces within a building should be secured.

When an object moves into the monitored zone and the light path between the light transmitter and the light receiver is thereby interrupted with sensors of the named kind, an object detection signal is generated which can, for example, result in the deactivation of a machine and/or in the triggering of an acoustic or optical warning signal.

With the currently customary light grids, a light pulse or a light pulse sequence is radiated which is detected by means of a threshold value detector. The respective light pulses can now, however, have interference signals superimposed on them, which at least makes the detection of the received pulses or pulse sequences more difficult. It is proposed in DE 199 26 214 A1 to use so-called chirp sequences which correlate well with one another as transmission signals for the suppression of interference signals. In this connection, the useful signals are subjected to a spectral spread to make them insensitive with respect to narrow band interference or pulse interference.

It is the underlying object of the invention to provide an improved optoelectronic sensor of the initially named kind which ensures an ideal signal-to-noise ratio with a design which is as simple as possible and with a range which is as large as possible.

This object is satisfied in accordance with the invention in that the light signals transmitted into the monitored zone by the light transmitter are each generated by an output signal modulated in accordance with a spread spectrum method using a random pseudo-noise code.

An ideal signal-to-noise ratio is also always ensured with larger ranges due to this design. Since the generation regulation for the spread code is known, the output signal can be filtered from the background noise by correlation. The correlation is considerably improved by the use in accordance with the invention of random pseudo-noise codes as spread codes. A common light receiver can thus in particular also be associated with a plurality of light transmitters in that different random pseudo-noise codes are used for the respective light transmitters. At the reception side, the signals can then be decoded by means of the different random pseudo-noise codes and it can be detected from which light transmitter which signal was transmitted. The active reception surface of the optical systems can thus be reduced accordingly. The respective ASICs can therefore in particular be better distributed over the monitored zone. 15 to 30% of the ASICs at the reception side can, for example, thus be saved in dependence on the resolution.

The random pseudo-noise code is preferably generated via a so-called primitive polynomial. Such a primitive polynomial can in particular have a Galois structure in software or a binary structure in hardware.

In accordance with a preferred practical embodiment of the optoelectronic sensor in accordance with the invention, the random pseudo-noise codes used include at least one of the following sequences:
  M sequences;
  Gold sequences;
  Kasami sequences;
  Hadamard-Walsh sequences;
  Barker sequences.

In the event, for example, that a light pulse has to be received in a specific time interval, the light pulse can therefore be mixed with a random pseudo-noise code, that is with a pulse sequence which has static properties of random noise. Such a pulse sequence can in particular be generated by a so-called primitive polynomial, that is in particular a polynomial having a Galois structure in software or a binary structure in hardware, whereby orthogonal pulse sequences arise in which the autocorrelation function is large, whereas the cross-correlation function is small. What is important is that random pseudo-noise codes are used as the spread code. In this connection, the specific random pseudo-noise codes named further above, that is the M sequences, the Gold sequences, Kasami sequences, Hadamard-Walsh sequences and/or Barker sequences are preferred which are in particular additionally suitable for light grids. These codes differ by their orthogonality under interference. With perfect synchronization, in particular the Hadamard-Walsh codes are of advantage. For light grids of today's design, in which in particular a pulse or a pulse sequence is transmitted which is detected by means of a threshold value detector, in particular Kasami sequences can advantageously be used since here an optical synchronization is present and desynchronization effects can occur. Barker codes are in particular suitable for the synchronization of light grids, whereas Gold codes are comparable to the Kasami sequences which, however, span a sub-space.

In accordance with a preferred practical embodiment of the optoelectronic sensor in accordance with the invention, the light signals transmitted by the light transmitter into the monitored zone are each generated by an output signal modulated in accordance with the DSSS (direct sequence spread spectrum) using the random pseudo-noise code.

In accordance with this DSSS method, a respective output signal can be spread by means of a preset bit sequence. This bit sequence is also called a spread code or a chipping sequence.

The light signals transmitted into the monitored zone by the light transmitter are expediently each generated by at least one light pulse mixed using the random pseudo-noise code. In this case, the respective output signal is therefore formed by at least one light pulse.

The light signal received by the light receiver can expediently be acted on by the random pseudo-noise code associated with the respective light transmitter for the identification or recovery of the output signal associated with a respective light transmitter.

In this connection, the control device preferably includes means to form the autocorrelation function between the received light signal and the respective random pseudo-noise code for the identification or recovery of the output signal associated with a respective light transmitter.

It is in particular also of advantage for the control device to include means to set the variable temporal offset between the random pseudo-noise code and the received light signal acted on by it such that a maximum value results for the autocorrelation function.

As already mentioned, different random pseudo-noise codes can advantageously be associated with different light transmitters.

In this connection, a common light receiver is in each case associated with at least two light transmitters and preferably in each case at least three light transmitters.

In accordance with a preferred practical embodiment of the optoelectronic sensor in accordance with the invention, a common light receiver can thus be associated with different light transmitters with which different random pseudo-noise codes are associated, with the light signals received by the common light receiver and/or a signal formed therefrom for the identification or recover of the output signals associated with the respective light transmitters being able to be acted on by the random pseudo-noise codes associated with the respective light transmitters.

Light transmitters and light receivers can be arranged on mutually oppositely disposed sides of the monitored zone. Alternatively, it is also possible to arrange light transmitters and light receivers on one side of the monitored zone and a retroreflector on the oppositely disposed side of the monitored zone. The second variant corresponds to an auto-collimation arrangement.

The optoelectronic sensor in accordance with the invention can above all also include a plurality of light transmitters and light receivers in a light grid arrangement, with in this case a respective plurality of light transmitters and light receivers arranged next to one another being able to be arranged in the respective required structure.

It is of particular advantage for in each case a common light receiver to be associated with a plurality of light transmitters and for the number of light receivers correspondingly to be less than the number of light transmitters.

Secure and/or reliable 3D cameras based on stereoscopy have to cope with large brightness dynamics of the ambient light. To be able to ensure the secure and/or reliable function under difficult lighting conditions, there is the possibility of supporting the optical input data by an active illumination. Since the laser protection and reasons of cost do not permit any further active illumination beyond a specific power limit, a new approach is required to increase the signal-to-noise ratio with an unchanged optical output power and thus to ensure the secure and/or reliable function of the sensor even under difficult lighting conditions. In accordance with a preferred practical embodiment of the optoelectronic sensor, it therefore includes a camera, in particular a secure and/or reliable camera, with which at least one light transmitter is associated for the active illumination of the monitored zone, with the light signals of said light transmitter transmitted into the monitored zone respectively being generated by an output signal modulated in accordance with the spread spectrum method using a random pseudo-noise code.

In this connection, the light transmitter associated with the camera and/or the camera are expediently controlled by the associated control device such that the active illumination takes place synchronously with the lighting of the sensitive surface.

A 3D stereoscopic camera is preferably provided as the camera.

In a preferred practical embodiment, a structured pattern, in particular a high-contrast pattern, is generated in the illuminated monitored zone by means of the light transmitter associated with the camera.

The spread-spectrum technique can therefore be used in the manner previously described not only, for example, in a light grid, but in particular advantageously also in the image-providing sensor system with active illumination, whereby in particular an increase in the effective range of the secure and/or reliable 3D camera is achieved based on active illumination. In this connection, the illumination light pulses can again be mixed with a random pseudo-noise pulse sequence in the previously described manner to obtain orthogonal pulse sequences.

The embodiments previously generally described in connection with an optoelectronic sensor can therefore also be realized specifically in accordance with the invention with a camera which is in particular secure and/or reliable.

The illumination can take place synchronously to the lighting of the sensitive surface of the camera. In this connection, the illumination can in particular take place by means of an optical element or light transmitter which generates a structured, high-contrast pattern in the illuminated space.

The light pulse for the illumination can again be mixed with a pseudo-noise pulse sequence which was, for example, generated by a so-called primitive polynomial, for example a Galois structure in software or a binary structure in hardware, whereby orthogonal pulse sequences arise. In this connection, in particular the following codes can again be used: M sequences, Barker codes, Kasami sequences, Gold codes and/or Hadamard-Walsh codes. In this connection, these codes differ in their orthogonality under interference. With perfect synchronization, for example, the Hadamard-Walsh codes are the most suitable.

If the recorded image sequence is correlated with the pulse sequence pattern, the respective grid can be detected substantially more easily than if no correlation were used.

The result is a considerable improvement in the signal-to-noise ratio. It has been shown with reference to simulations carried out using 30 mm optical systems that ranges of more than 100 m can be achieved with correspondingly secure and/or reliable cameras.

In the case of a light grid, in particular Kasami sequences, Gold codes, M sequences, Barker codes, Hadamard-Walsh codes or a combination of these codes are of advantage as random pseudo-noise codes.

The respective pulse sequences can only be generated having the lengths of $2^N-1$ chips, where N represents a whole number. Since a fast response time is important in the light grid region, it is not possible in practice to selected an N of any desired high level. In practice, an N has been found to be particularly advantageous in the range from 5 to a maximum of 8, which means that the pulse sequences can be quasi-orthogonal in practice.

Light grids are therefore still relatively sensitive for external light transmitters, that is in particular for different codes of a similar structure. This is particularly critical since the fluctuations of the light energy of LEDS are subject to natural fluctuation widths due to the manufacturing process. It can thus be assumed that an interference level can radiate into the receiver more strongly than the actual useful transmitter by a maximum of a factor of 2, which means that the useful code can be weaker than the interference code by such a factor. This in turn has the result that the receiver occasionally recognizes the interference code as a useful signal so that a reliable deactivation is no longer ensured.

To prevent this or to minimize the so-called false acceptance rate, a preferred practical embodiment of the optoelectronic sensor in accordance with the invention is characterized in that the control device is made such that at least one two-fold evaluation of output signals of the light receiver respectively takes place for the generation of a respective object detection signal.

In particular the interference sensitivity is thus reduced with respect to interference transmitters which use a similar code to the useful code, whereby a risk-free parallel operation of a plurality of systems is made possible.

In this connection, the control device is preferably made such that a respective object detection signal is only generated when it was found at least twice sequentially in time that no light signal was received by the light receiver which can be associated with the respective light transmitter.

It is in particular of advantage in this connection for the control device to include means in order to form the autocorrelation function between the respective light signal and the respective random pseudo-noise code at least twice sequentially in time for the identification of a respective output signal associated with the respective light transmitter.

The at least two light signals transmitted by the respective light transmitter for the at least two-fold evaluation sequentially in time are preferably offset in time such that a different time offset results between the random pseudo-noise code and the respective received light signals acted on by this random pseudo-noise code.

Different chip periods for the respective random pseudo-noise code can in particular be selected for the at least two evaluations.

It is in particular also of advantage for a defined detection threshold to be provided at the reception side for each light signal transmitted by the light transmitter.

The length of the random pseudo-noise code sequence is preferably selected in dependence on the number of non-overlapping transmitted light signals activated at the same time.

In accordance with a further preferred embodiment of the optoelectronic sensor in accordance with the invention, the random pseudo-noise code is divided into at least two chip sequences for the realization of a combined TDMA system and CDMA system (TDMA=Time Division Multiple Access method; CDMA=Code Division Multiple Access method). The following strategies can therefore in particular be used to ensure that the interference code is not recognized as a useful code.

A double evaluation is carried out;

Switching to red only takes place if the desired signal is not see twice after one another;

The time interval from ray to ray is varied, for example by some µs, depending on the code. The ray in the correlation evaluation thereby no longer appears at the same position in the second evaluation;

The chip period is modified a little depending on the code. The ray in the correlation evaluation thereby no longer appears at the same position in the second evaluation. Such a solution can in particular be implemented in a simple manner in hardware;

Since the energy can fluctuate from ray to ray due to the manufacturing process of LEDs by a factor of up to 2, a detection threshold can be introduced per ray, whereby a better decision criterion can be obtained for the acceptance of a respective signal;

The longer the code sequence, the "more orthogonal" the codes are. If a plurality of rays which do not overlap are activated at the same time, a longer code can be selected with a response time which is the same overall, whereby a higher signal-to-noise ratio is achieved;

The code is divided into two chip sequences, whereby a combination of TDMA and CDMA can be realized. However, an increase in the response time also result in this connection.

An improvement in the signal-to-noise ratio primarily results with the double evaluation in accordance with the invention. Simulations which have been carried out have shown that, for example, ranges of more than 100 m can be achieved with a corresponding double evaluation when 30 mm optical systems are used.

There are, for example, a total of 241 useful Kasami codes when N=6. If, for example, 6 codes are used which satisfy the demands with respect to the demanded orthogonality, practically no interference also occurs with interference signals larger than the useful signal by a factor of 2, which represents a considerable improvement with respect to the previously known optoelectronic sensors.

The invention will be explained in more detail in the following with reference to embodiments and to the drawing; there are shown in this:

FIG. 1 a schematic part-illustration of an exemplary embodiment of an optoelectronic sensor, with only one channel being shown;

FIG. 2 a basic representation for the illustration of the DSS method which can be used for spectrum spreading;

FIG. 3 the frequency spectrum of the output signal shown in FIG. 2 and of the output signal shown in FIG. 2 modulated in accordance with the DSSS method using a random pseudo-noise code;

FIG. 4 the energy spectra of the output signal, of the random pseudo-noise code and of the output signal modulated in accordance with the DSSS method using the random pseudo-noise code;

FIG. 5 a basic representation for the illustration of the TDMA method;

FIG. 6 an exemplary application of the TDMA method on an optoelectronic sensor in which e.g. a common light receiver is associated with three respective light transmitters;

FIG. 7 a schematic representation of a first section of an exemplary synchronization of a light receiver having a light transmitter;

FIG. 8 a schematic representation of a further section of the synchronization of the light receiver, with the light transmitter;

FIG. 9 the frequency spectra of a reference random pseudo-noise code and of an input signal modulated using a corresponding random pseudo-noise code as well as a correlation spectrum resulting from a comparison of these two signals, with the correlation spectrum still not allowing any coincidence of the two signals to be recognized;

FIG. 10 a representation comparable with FIG. 9, with the two signals to be compared to one another, however, being offset relative to one another such that the correlation spectrum allows a coincidence of the two signals to be recognized;

FIG. 11 the frequency spectra of a reference random pseudo-noise code and of a very noisy input signal demodulated using a corresponding random pseudo-noise code as well as a correlation spectrum resulting from a comparison of these two signals, with the correlation spectrum still not allowing any coincidence of the two signals to be recognized; and FIG. 12 a representation comparable with FIG. 11, with the two signals to be compared to one another, however, being offset relative to one another such that the correlation spectrum allows a coincidence of the two signals to be recognized.

FIG. 1 shows in a schematic part representation an exemplary embodiment of an optoelectronic sensor 10 having at least one light transmitter 12 for the transmission of light signals into a monitored zone 14, at least one light receiver 16 for the reception of light signals 82 transmitted by the light transmitter 12 and a control device 18 associated with the light transmitter 12 and the light receiver 16.

In FIG. 1, only a light transmitter 12 as well as only one light receiver 16 and accordingly only one channel 30 are shown. The optoelectronic sensor 12 can, however, in particular also include a plurality of light transmitters and light receivers which can in particular be provided in a light grid arrangement. The optoelectronic sensor 10 can therefore in particular also have a plurality of channels. In this connection, in particular a common light receiver 16 can also be associated with a respective plurality of light transmitters 12, as will be explained in more detail further below.

The control device 18 includes means for the generation and/or influencing of the light signals 28 and for the generation of an object detection signal in the case of the presence of an object in the monitored zone 14 in dependence on the output signals of the light receiver 16.

The light signals 28 transmitted into the monitored zone by the light transmitter 12 are each generated by an output signal 26 modulated in accordance with the spread spectrum method using a random pseudo-noise code.

As can be recognized with reference to FIG. 1, the light transmitter 12 can in particular include a channel encoder 20, a modulator 22 and a random pseudo-noise generator 24.

In this connection, an output signal 26 is generated via the channel encoder 20 which is associated with the light transmitter 12 and which is modulated by the modulator 22 acted on by the random pseudo-noise generator 24 in accordance with the spread spectrum method using a spread code formed by a random pseudo-noise code. The correspondingly modulated output signal is then transmitted as a light signal 28 into the monitored zone 14 or is received by the light receiver 16 via the respective passage 30 provided that the respective light path is not interrupted by an object located in the monitored zone 14.

The light receiver 16 includes a demodulator 32, a random pseudo-noise generator 34 acting on said demodulator with a corresponding spread code or random pseudo-noise code and also a channel encoder 36. In this connection, the demodulator 32 is acted on by the random pseudo-noise generator 34 for the identification or recovery of the output signal 26 associated with the light transmitter 12 using the random pseudo-noise cod associated with the light transmitter 12.

An input signal 38 can therefore be supplied to the channel encoder 20 of the light transmitter 12 in order, for example, to generate an analog output signal 36 of low bandwidth. The output signal 26 is in particular modulated using a numerical sequence or a binary sequence in the form of a random pseudo-noise code. The spectrum of the output signal 26 is spread via this random pseudo-noise code, whereby the bandwidth is increased accordingly. A corresponding random pseudo-noise code is used for the demodulation of the received signal provided with a spread spectrum on the side of the light receiver 16. Subsequently, the demodulated signal is supplied to the channel decoder 36 for data recovery or data identification.

The random pseudo-noise code can in particular be generated via a so-called primitive polynomial. In this connection, this random pseudo-noise code preferably includes at least one of the following sequences:

M sequences;
Gold sequences;
Kasami sequences;
Hadamard-Walsh sequences;
Barker sequences.

The light signals 28 transmitted into the monitored zone 14 by the light transmitter 12 can each in particular be generated by an output signal modulated in accordance with the DSSS (direct sequence spread spectrum) method using the random pseudo-noise code. In this connection, the light signals 28 transmitted into the monitored zone 14 by the light transmitter 12 can in particular each be generated by at least one light pulse mixed or multiplied by the random pseudo-noise code. A respective light pulse can be provided as the output signal.

The principle of the DSSS method which can be used for the spectrum spreading is illustrated in FIG. 2.

Accordingly, each bit of a respective incoming data stream can be represented by a plurality of bits in the light signal 28 which is transmitted into the monitored zone 14 and which was generated using a random pseudo-noise code as the spread code.

On an observation in the time region, it applies that the spread rate with which the bits of the output signal 26 (cf. also FIG. 1) are spread for the formation of the light signal 28 transmitted into the monitored zone 14 is equal to the N-fold of the bit rate of the output signal 26, with N indicating the number of bits of the random pseudo-noise code with which a respective bit of the output signal 26 is encoded.

FIG. 3 shows the frequency spectra of the output signal 26 shown in FIG. 2 and of the output signal shown in FIG. 2 modulated in accordance with the DSSS method using the random pseudo-noise code, that is of the light signal 28. It applies to the frequency range in this connection that the bandwidth of the light signal 28 transmitted into the monitored zone 14 is equal to the N-fold data bandwidth of the output signal 26.

FIG. 4 shows the energy spectra of the output signal 26, of the random pseudo-noise code 40 and of the output code modulated in accordance with the DSSS method using the random pseudo-noise code, that is of the light signal 28 transmitted into the monitored zone 14.

The control device 18 (cf. FIG. 1) can include means to form the autocorrelation function between the received light signal and the respective random pseudo-noise code for the identification or recovery of the output signal associated with a respective light transmitter 12.

As already mentioned, different random pseudo-noise codes can be associated with different light transmitters 12. in this connection, a common light receiver 16 can in particular in each case be associated with a respective at least two light transmitters 12, preferably with a respective at least three light transmitters.

If a common light receiver 16 is associated with different light transmitters 12 with which different random pseudo-noise codes are associated, the light signals received by the common light receiver 16 and/or a signal formed therefrom for the identification or recovery of the output signals 26 associated with the respective light transmitters 12 an acted on by the random pseudo-noise codes associated with the respective light transmitters 12.

In FIG. 5, the principle of a CDMA (code division multiple access) method which can be used for this purpose is illustrated.

According to this, different light transmitters 12A, 12B to 12 N can simultaneously transmit light signals using the respective channel 14. In this connection, different random pseudo-noise codes are associated with the different transmitters 12A to 12N. Different orthogonal spread signals are accordingly generated by different encoders or modulators 22 and are then transmitted into the monitored zone 14 and move via the respective channel 30 to the common light receiver 16 which receives the sum of all the transmitted signals. The data or the output signal of a respective light transmitter 12A-12N can then be recovered or identified via a respective correlator or demodulator 32, for which purpose the demodulator 32 is acted on by the random pseudo-noise code associated with the respective light transmitter in the manner described. In the present case, the correlator or demodulator 32 is acted on by the random pseudo-noise code associated with the light transmitter 12A so that its output signal is identified or recovered.

A multiplex technique is therefore used with this CDMA method which brings along a spread spectrum.

In this connection, each bit of a respective output signal is broken up into k so-called chirps or chips in accordance with a specific pattern which can be preset for the respective light transmitter 12. The relationship applies Chip data rate of the new channel=$k \cdot D \cdot$chips/sec where k=the number of chips;
D=rate of the data signal or output signal.

FIG. 6 shows an exemplary use of such a CDMA method on an optoelectronic sensor in which e.g. a common light receiver is associated with three respective light transmitters 12A, 12B.

In this connection, different random pseudo-noise codes are associated with the light transmitters 12A, 12B and 12C in accordance with FIG. 6a). They each include six bits, for example.

In FIG. 6b), transmitted light signals and recovered signals at the reception side are shown for the event that the light transmitter 12A transmits a data bit multiplied by the random pseudo-noise code associated with it. In this connection, the data bit is individually multiplied by the bits, here six for example, of the random pseudo-code, whereby a modulated light signal to be transmitted including six bits results.

If the data bit is equal to 1, the bits of the light signal to be transmitted after the multiplication each have the value of the corresponding bit of the random pseudo-code. At the reception side, the received light signal for the demodulation is multiplied bit-wise by the same random pseudo-code. The correspondingly demodulated signal likewise again has six bits which each have the value 1 in the present case, which results in the value 6 in sum so that the transmitted data bit 1 is identified.

If, in contrast, the data bit is equal to 0, the signs of the bits of the random pseudo-code are respectively inverted for the formation of the light signal to be transmitted. At the reception side, the received light signal for the demodulation is again multiplied bit-wise by the same random pseudo-code. The correspondingly demodulated signal likewise again has six bits which each have the value −1 in the present case, which results in the value −6 in sum so that the transmitted data bit 0 is identified.

FIG. 6c) relates to the case that a light signal is transmitted by the light transmitter 12B which is generated by a data bit 1 modulated using the associated random pseudo-code and an attempt is made at the reception side to recover a data signal originating from the light transmitter 12A. At the reception side, the received light signal for the demodulation is therefore not multiplied bit-wise by the random pseudo-code associated with the light transmitter 12B, but by the random pseudo-code associated with the light transmitter 12A. The resulting signal again has six bits which, however, again result in the value 0 in sum, which means that no data signal is identified here.

FIG. 6d) relates to the case that a light signal is transmitted by the light transmitter 12C which is generated by a data bit 1 modulated using the associated random pseudo-code and an attempt is made at the reception side to recover a data signal originating from the light transmitter 12A. At the reception side, the received light signal for the demodulation is therefore not multiplied bit-wise by the random pseudo-code associated with the light transmitter 12C, but by the random pseudo-code associated with the light transmitter 12A. The resulting signal again has six bits which, however, result in the value 0, which means that no data signal was identified here.

FIG. 6e) relates to the case that a light signal is respectively transmitted both by the light transmitter 12B and by the light transmitter 12C which is generated by a data bit 1 modulated using the associated random pseudo-code and an attempt is made at the reception side to recover a data signal originating from the light transmitter 12B. A combined signal first results in this connection whose six digits each have a value which corresponds to the sum of the respective bits of the light signals of the two light transmitters 12B and 12C. At the reception side, the values of the individual digits of this combined signal are then multiplied bit-wise by the random pseudo-code associated with the light receiver 12B. The resulting signal has six digits which result in the value 8 in sum.

The two random pseudo-codes associated with the light transmitters 12A and 12B are therefore orthogonal. The random pseudo-codes associated with the light transmitters 12A and 12C are also orthogonal. In contrast, the random pseudo-codes associated with the light transmitters 12B and 12C are not orthogonal.

The control device 18 (cf. FIG. 1) can moreover include means to set a variable time offset between the respective random pseudo-noise code and the received light signal acted on thereby such that a maximum value results for the auto-correlation function.

FIG. 7 shows in a schematic representation a first section of an exemplary synchronization of a light receiver having a light transmitter.

As can be recognized with reference to FIG. 7, an input signal 42 is supplied to an A/D converter 44 which is followed by an offset correction 46 whose output signal is supplied to a correlator 48 which moreover receives reference data from a reference table 50. The correlator 48 finally delivers a correlation spectrum. In this connection, the peak 52 is detected with a sufficient signal-to-noise ratio for which purpose a corresponding position and signal-to-noise ratio detector 54 is provided which in turn acts on a PI controller 56 which presets the respective time offset $t_s$ to control the A/D converter 44 to determine the starting time of the incoming data sequence accordingly.

In the present synchronization, the peak of the correlation spectrum is therefore detected with a sufficient signal-to-noise ratio. The peak 52 is set to the center of the correlation spectrum with a start of the PI controller 56. The sampling by the A/D converter 44 takes place at different repetition times preset by the sampling time for the corresponding signal detection. If the respective signal is detected, the sampling time is set by the PI controller 56. The different elements to be recognized in FIG. 7 can be associated at least in part with the control device 18 (cf. FIG. 1).

FIG. 8 shows in a schematic representation a further section of the synchronization of the light receiver with the light transmitter.

In this connection, the synchronization is ended when the peak 52 of the correlation spectrum is stable in time. The correlation process is then limited to minimize the response time. The peak 52 of the correlation spectrum is stable when the repetition rate is equal to the offset time. The time stamp of another ray can be derived via the relationship $t_s = t_s$(Sync)/Number of rays.

All the rays are then synchronized. The operation of the safety light grid is subsequently activated.

In another respect, the same elements as in FIG. 7 can again at least substantially be recognized in FIG. 8, with the same reference numerals being associated with elements corresponding to one another.

FIG. 9 shows the frequency spectra of a random reference pseudo-noise code and of an input signal modulated using a corresponding random pseudo-noise code as well as a correlation spectrum resulting from a comparison of these two signals. In this connection, the correlation spectrum still does not allow any coincidence of the two signals to be recognized.

FIG. 10 shows a representation comparable with FIG. 9, with the two signals to be compared to one another, however, being offset relative to one another such that the correlation spectrum allows a coincidence of the two signals to be recognized.

FIG. 11 shows the frequency spectra of a random reference pseudo-noise code and of a very noisy input signal modulated using a corresponding random pseudo-noise code as well as a correlation spectrum resulting from a comparison of these two signals. In this connection, the correlation spectrum still does not allow any coincidence of the two signals to be recognized.

FIG. 12 shows a representation comparable with FIG. 11, with the two signals to be compared to one another, however, being offset relative to one another such that the correlation spectrum allows a coincidence of the two signals to be recognized.

Figure 1:
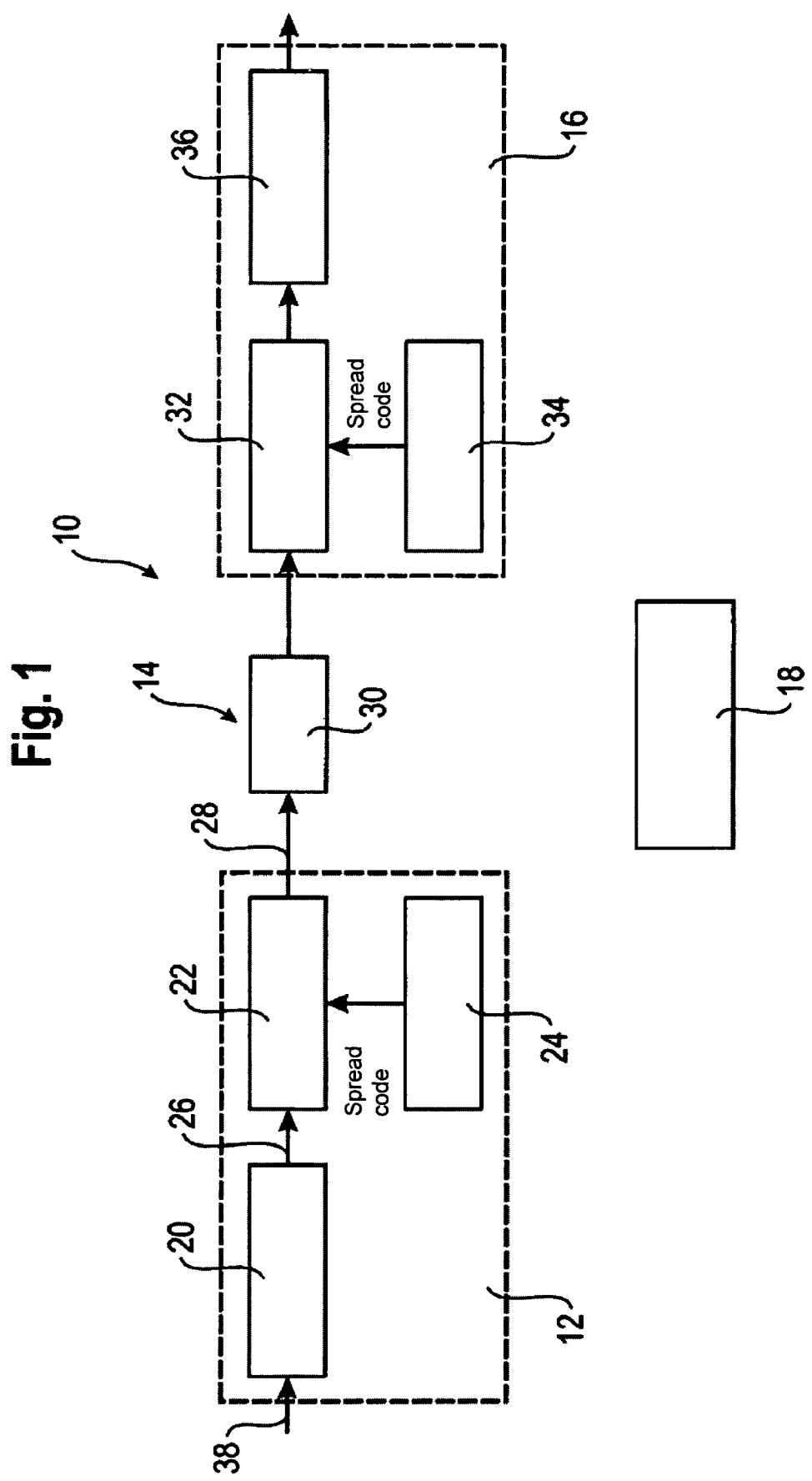
Figure 2:
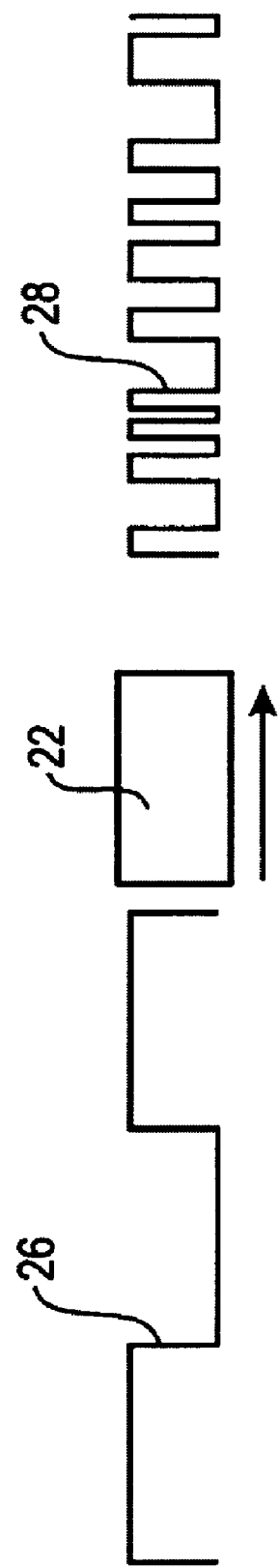
Figure 3:
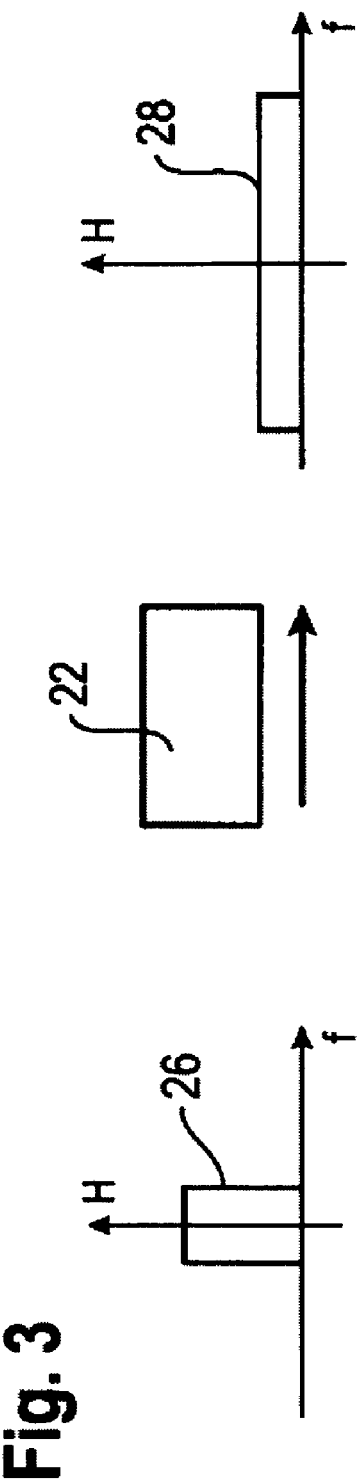
Figure 8:
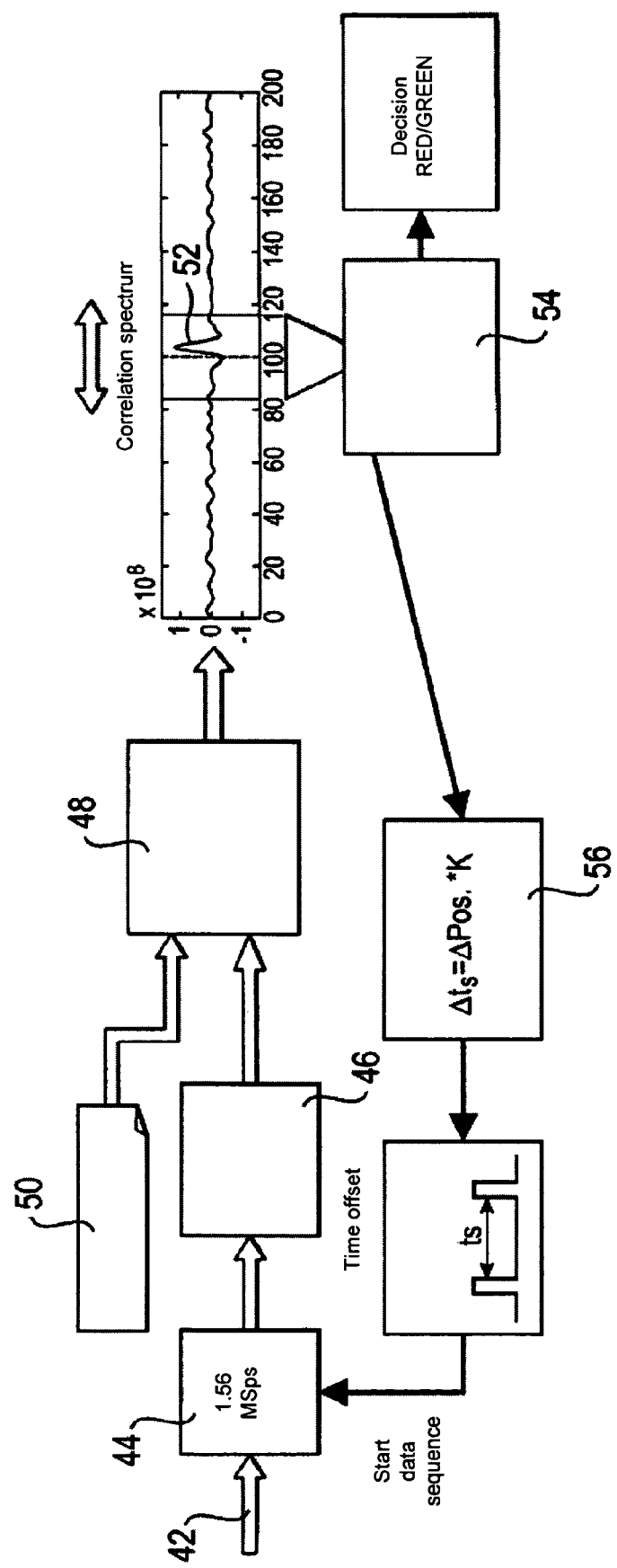

In this connection, a respective peak occurs in the range of the value "100" in the correlation spectrum both in the example of FIG. 10 and in the example of FIG. 12 and a corresponding coincidence of the two signals can be recognized by this.

The random pseudo-codes can in particular be generated by corresponding sliding registers. Correspondingly matched filters can be used for the decoding at the reception side.

As already mentioned, the optoelectronic sensor 10 can in particular include a plurality of light transmitters 12 and light receivers 16 in a light grid arrangement. In this connection, a common light receiver 16 can be associated with a respective plurality of light transmitters 12 and the number of light receivers 16 can correspondingly be less than the number of light transmitters 12. The light transmitters 12 and light receivers 16 can be arranged on mutually oppositely disposed sides of the monitored zone 14. Alternatively, such embodiments are also conceivable in which the light transmitters 12 and, the light receivers 16 are arranged on one side of the monitored zone 14 and a retroreflector is arranged on the oppositely disposed side of the monitored zone 14. In this connection, this second variant corresponds to an auto-collimation arrangement.

A number of advantages is achieved by the solution in accordance with the invention. In particular an ideal signal-to-noise ratio is thus ensured with a design which is as simple as possible and a range which is as large as possible. The active reception surface of optical systems can be considerably reduced in a respective light grid. Received signals with smaller signal levels are also reliably received.

As likewise already mentioned, the optoelectronic sensor can advantageously also include at least one in particular secure and/or reliable camera with which at least one light transmitter 12 is associated for the active illumination of the monitored zone 14, with the light signals of said light transmitter transmitted into the monitored zone 14 each again being generated by an output signal modulated in accordance with the spread spectrum method using a random pseudo-noise code.

In this connection, the light transmitter 12 associated with the camera and/or the camera are in particular controlled by the associated control device 18 such that the active illumination takes place synchronously with the lighting of the sensitive surface of the camera.

A 3D stereoscopic camera can in particular be provided as the camera.

A structured high-contrast pattern can expediently be generated in the illuminated monitored zone by means of the light transmitter 12 associated with the camera.

As likewise already mentioned, the control device 18 can in particular also be made such that at least one two-fold evaluation of output signals of the light receiver 16 respectively takes place for the generation of a respective object detection signal. In this connection, the control device is in particular made such that a respective object detection signal is only generated when it was found at least twice sequentially in time that no light signal was received by the light receiver 12 which can be associated with the respective light transmitter.

In this connection, the control device 18 can in particular include means to form the autocorrelation function between the respective received light signal and the respective random pseudo-noise code at least twice sequentially in time for the identification of a respective output signal 26 associated with the respective light transmitter 12.

The at least two light signals transmitted by the respective light transmitter 12 for the at least two-fold evaluation sequentially in time are preferably offset in time such that a different time offset results between the random pseudo-noise code and the respective received light signals acted on by this random pseudo-noise code.

Different chip periods for the respective random pseudo-noise code can in particular also be selected for the at least two evaluations.

At the reception side, a defined detection threshold can be provided for each light signal transmitted by the light transmitter 12.

The length of the random pseudo-noise code sequence can be selected in dependence on the number of non-overlapping transmitted light signals activated at the same time.

The random pseudo-noise code can be split into at least two chip sequences for the realization of a combined TDMA and CDMA system.

REFERENCE NUMERAL LIST 10 optoelectronic sensor
12 light transmitter
14 monitored zone
16 light receiver
18 control device
20 channel encoder
22 modulator
24 random pseudo-noise generator
26 output signal
28 light signal
30 channel
32 demodulator
34 random pseudo-noise generator
36 channel decoder
38 input signal
40 random pseudo-noise code
42 input signal
44 A/D converter
46 offset correction
48 correlator
50 reference table 52 peak
54 position and signal-to-noise detector
56 PI controller

The invention claimed is:

1. An optoelectronic sensor having at least one light transmitter for the transmission of light signals into a monitored zone, at least one light receiver for the reception of light signals transmitted by the light transmitter and a control device for the generation and/or influencing of the light signals and for the generation of an object detection signal in the case of the presence of an object in the monitored zone in dependence on the output signals of the light receiver, characterized in that the light signals transmitted into the monitored zone by the light transmitter are each generated by an output signal modulated in accordance with a the spread spectrum method using a random pseudo-noise code, the light signal received by the light receiver can be acted on by the random pseudo-noise code associated with the respective light transmitter for the identification of the output signal associated with a respective light transmitter, the control device includes means to form an autocorrelation function between the received light signal and the respective random pseudo-noise code for the identification of the output signal associated with a respective light transmitter, and the control device includes means to set a variable time offset between the random pseudo-noise code and the received light signal acted on by it such that a maximum value results for the autocorrelation function.

2. An optoelectronic sensor in accordance with claim 1, characterized in that the random pseudo-noise code is generated via a so-called primitive polynomial.

3. An optoelectronic sensor in accordance with claim 1, characterized in that the random pseudo-noise code includes an M sequence.

4. An optoelectronic sensor in accordance with claim 1, characterized in that the random pseudo-noise code includes a Gold sequence.

5. An optoelectronic sensor in accordance with claim 1, characterized in that the random pseudo-noise code includes a Kasami sequence.

6. An optoelectronic sensor in accordance with claim 1, characterized in that the random pseudo-noise code includes a Hadamard-Walsh sequence.

7. An optoelectronic sensor in accordance with claim 1, characterized in that the random pseudo-noise code includes a Barker sequence.

8. An optoelectronic sensor in accordance with claim 1, characterized in that the light signals transmitted into the monitored zone by the light transmitter are each generated by an output signal modulated in accordance with a direct sequence spread spectrum (DSSS) method using the random pseudo-noise code.

9. An optoelectronic sensor in accordance with claim 1, characterized in that the light signals transmitted into the monitored zone by the light transmitter are each generated by at least one light pulse mixed using the random pseudo-noise code.

10. An optoelectronic sensor in accordance with claim 1, characterized in that different random pseudo-noise codes are associated with different light transmitters.

11. An optoelectronic sensor in accordance with claim 1, characterized in that a common light receiver is associated with a respective at least two light transmitters.

12. An optoelectronic sensor in accordance with claim 1, characterized in that a common light receiver is associated with a respective at least three light transmitters.

13. An optoelectronic sensor in accordance with claim 1, characterized in that a common light receiver is associated with different light transmitters with which different random pseudo-noise codes are associated; and in that the light signals received by the common light receiver and/or a signal formed therefrom for the identification of the output signals associated with the respective light transmitters are acted on by the random pseudo-noise codes associated with the respective light transmitters.

14. An optoelectronic sensor in accordance with claim 1, characterized in that the light transmitters and the light receivers are arranged on mutually oppositely disposed sides of the monitored zone.

15. An optoelectronic sensor in accordance with claim 1, characterized in that the light transmitters and the light receivers are arranged on one side of the monitored zone and a retroreflector is arranged on the oppositely disposed side of the monitored zone.

16. An optoelectronic sensor in accordance with claim 1, characterized in that a plurality of light transmitters and light receivers are provided in a light grid arrangement.

17. An optoelectronic sensor in accordance with claim 1, characterized in that a common light receiver is associated with a respective plurality of light transmitters and the number of light receivers is correspondingly less than the number of light transmitters.

18. An optoelectronic sensor in accordance with claim 1, characterized in that it includes at least one camera, in particular a secure and/or reliable camera, with which at least one light transmitter is associated for the active illumination of the monitored zone with the light signals of said light transmitter transmitted into the monitored zone being generated by an output signal modulated in accordance with the spread spectrum method using a random pseudo-noise code.

19. An optoelectronic sensor in accordance with claim 18, characterized in that the light transmitter associated with the camera and/or the camera are controlled by the associated control device such that the active illumination takes place synchronously with the lighting of the sensitive surface of the camera.

20. An optoelectronic sensor in accordance with claim 18, characterized in that a 3D stereoscopic camera is provided as the camera.

21. An optoelectronic sensor in accordance with claim 18, characterized in that a structured pattern, in particular a high-contrast pattern, is generated in the illuminated monitored zone by means of the light transmitter associated with the camera.

22. An optoelectronic sensor in accordance with claim 1, characterized in that the control device is designed such that at least one respective two-fold evaluation of output signals of the light receiver takes place for the generation of a respective object detection signal.

23. An optoelectronic sensor in accordance with claim 22, characterized in that the control device is made such that a respective object detection signal is only generated when it was found at least twice sequentially in time that no light signal was received by the light receiver which can be associated with the respective light transmitter.

24. An optoelectronic sensor in accordance with claim 23, characterized in that the control device includes means to form the autocorrelation function between the respective received light signal and the respective random pseudo-noise code at least twice sequentially in time for the identification of a respective output signal associated with the respective light transmitter.

25. An optoelectronic sensor in accordance with claim 24, characterized in that the at least two light signals transmitted by the respective light transmitter for the at least two-fold evaluation sequentially in time are offset in time such that a different time offset results between the random pseudo-noise code and the respective received light signals acted on by this random pseudo-noise code.

26. An optoelectronic sensor in accordance with claim 22, characterized in that different chip periods for the respective random pseudo-noise code are selected for the at least two evaluations.

27. An optoelectronic sensor in accordance with claim 22, characterized in that, at the reception side, a defined detection threshold is provided for each light signal transmitted by the light transmitter.

28. An optoelectronic sensor in accordance with claim 22, characterized in that the length of the random pseudo-noise code sequence is selected in dependence on the number of non-overlapping transmitted light signals activated at the same time.

29. An optoelectronic sensor in accordance with claim 22, characterized in that the random pseudo-noise code is split into at least two chip sequences for the realization of a combined TDMA and CDMA system.

* * * * *